US012570551B2

(12) United States Patent
Kang et al.

(10) Patent No.: US 12,570,551 B2
(45) Date of Patent: Mar. 10, 2026

(54) APPARATUS FOR MANUFACTURING A COMPOSITE DEIONIZATION ELECTRODE

(71) Applicants: SIONTECH CO., LTD., Daejeon (KR); KYUNGDONG NAVIEN CO., LTD., Pyeongtaek-si (KR)

(72) Inventors: Kyungseok Kang, Daejeon (KR); Kyunghan Lee, Daejeon (KR); Hyunwoo Yoo, Daejeon (KR); Namsoo Park, Daejeon (KR); Jinyong Park, Pyeongtaek-si (KR)

(73) Assignees: SIONTECH CO., LTD., Yuseong-gu (KR); KYUNGDONG NAVIEN CO., LTD., Pyeongtaek-si (KR)

( * ) Notice: Subject to any disclaimer, the term of this patent is extended or adjusted under 35 U.S.C. 154(b) by 884 days.

(21) Appl. No.: 17/786,064

(22) PCT Filed: Dec. 9, 2020

(86) PCT No.: PCT/KR2020/017930
§ 371 (c)(1),
(2) Date: Jun. 16, 2022

(87) PCT Pub. No.: WO2021/125675
PCT Pub. Date: Jun. 24, 2021

(65) Prior Publication Data
US 2023/0052804 A1 Feb. 16, 2023

(30) Foreign Application Priority Data
Dec. 16, 2019 (KR) ........................ 10-2019-0167559

(51) Int. Cl.
*H01M 50/403* (2021.01)
*C02F 1/461* (2023.01)
(Continued)

(52) U.S. Cl.
CPC ........ *C02F 1/46109* (2013.01); *C02F 1/4691* (2013.01); *H01M 50/403* (2021.01); *H01M 50/46* (2021.01); *C02F 2001/46138* (2013.01)

(58) Field of Classification Search
CPC ..... C08J 5/22; C02F 1/46109; H01M 50/403; H01M 50/46
(Continued)

(56) References Cited

U.S. PATENT DOCUMENTS 2,566,960 A * 9/1951 Philipps ................ H01M 50/44
264/109
6,913,786 B2 * 7/2005 Proulx ................. B01D 65/102
156/244.11
(Continued)

FOREIGN PATENT DOCUMENTS

KR 101410642 B1 6/2014
KR 20160059285 A 5/2016
(Continued)

OTHER PUBLICATIONS

International Search Report for Application No. PCT/KR2020/017930, mailed Mar. 30, 2021, (6 pages).

*Primary Examiner* — Karl Kurple
(74) *Attorney, Agent, or Firm* — NIXON PEABODY LLP

(57) ABSTRACT

THE PRESENT INVENTION RELATES TO AN APPARATUS AND METHOD FOR MANUFACTURING A COMPOSITE DEIONIZATION ELECTRODE, IN WHICH, IN A COMPOSITE DEIONIZATION ELECTRODE MANUFACTURING PROCESS, AN ION EXCHANGE LAYER HAVING A UNIFORM THICKNESS CAN BE COATED IN A STATE IN WHICH THE TENSION OF A SHEET ON WHICH THE ION EXCHANGE LAYER IS FORMED CAN BE SUFFICIENTLY SECURED, THUS ENABLING THE MASS
(Continued)

PRODUCTION OF A HIGH-QUALITY COMPOSITE DEIONIZATION ELECTRODE.

10 Claims, 4 Drawing Sheets

(51) Int. Cl.
  *C02F 1/469* (2023.01)
  *H01M 50/46* (2021.01)
(58) Field of Classification Search
  USPC .................................. 156/239; 264/257, 258
  See application file for complete search history.

(56) References Cited

U.S. PATENT DOCUMENTS

| | | | | |
|---|---|---|---|---|
| 11,821,078 | B2 * | 11/2023 | Kuwano | H01L 21/02274 |
| 11,823,866 | B2 * | 11/2023 | Kang | H01L 21/0228 |
| 11,823,876 | B2 * | 11/2023 | Lee | H01J 37/32449 |
| 11,837,494 | B2 * | 12/2023 | Kim | B65G 47/915 |
| 11,898,242 | B2 * | 2/2024 | Zope | H10D 62/121 |
| 12,040,497 | B2 * | 7/2024 | Sakashita | B32B 37/0038 |
| 2003/0059657 | A1 * | 3/2003 | Stone | H01M 8/1062 |
| | | | | 429/483 |
| 2010/0051181 | A1 * | 3/2010 | Mori | H01M 4/8896 |
| | | | | 156/390 |
| 2015/0021262 | A1 * | 1/2015 | Diep | B01D 71/56 |
| | | | | 210/500.33 |
| 2016/0181644 | A1 * | 6/2016 | Ohashi | H01M 8/1093 |
| | | | | 429/479 |
| 2019/0160457 | A1 * | 5/2019 | Okuya | C08F 259/08 |
| 2019/0337824 | A1 * | 11/2019 | Seo | C02F 1/46109 |
| 2022/0302425 | A1 * | 9/2022 | Cheon | H01M 4/04 |
| 2022/0367974 | A1 * | 11/2022 | Eskra | H01M 50/403 |
| 2023/0217579 | A1 * | 7/2023 | Lee | C23C 16/513 |
| | | | | 118/620 |
| 2024/0266580 | A1 * | 8/2024 | Wu | B32B 38/0004 |

FOREIGN PATENT DOCUMENTS

| | | | |
|---|---|---|---|
| KR | 101806186 | B1 | 1/2018 |
| KR | 20180001915 | A | 1/2018 |
| KR | 20190039111 | A | 4/2019 |
| KR | 102160961 | B1 | 9/2020 |
| WO | 2014042077 | A1 | 3/2014 |

* cited by examiner

[FIG. 1]
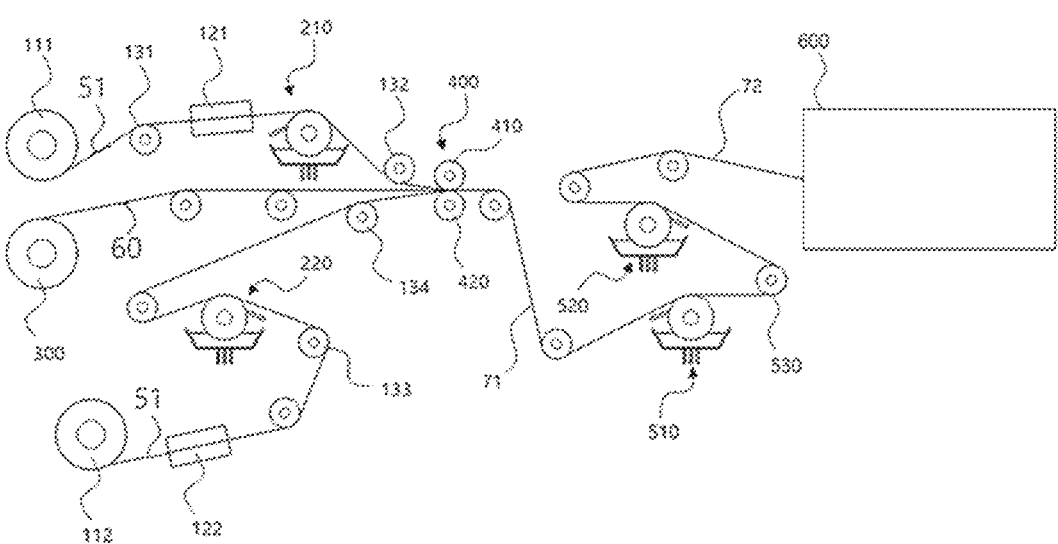

【FIG. 2】
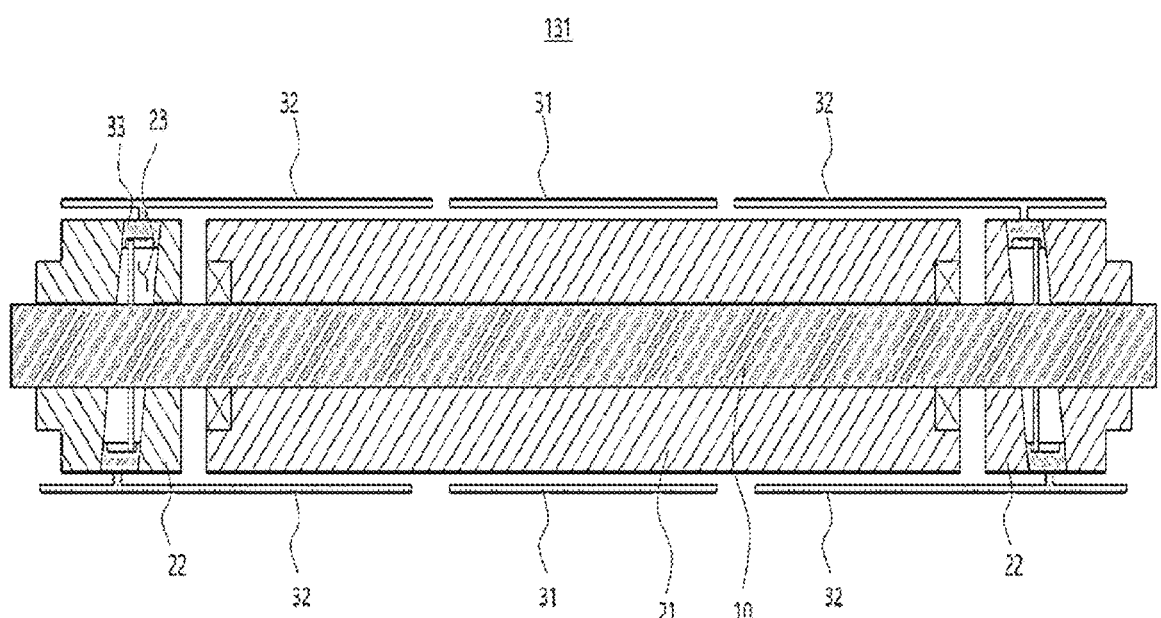

【FIG. 3】
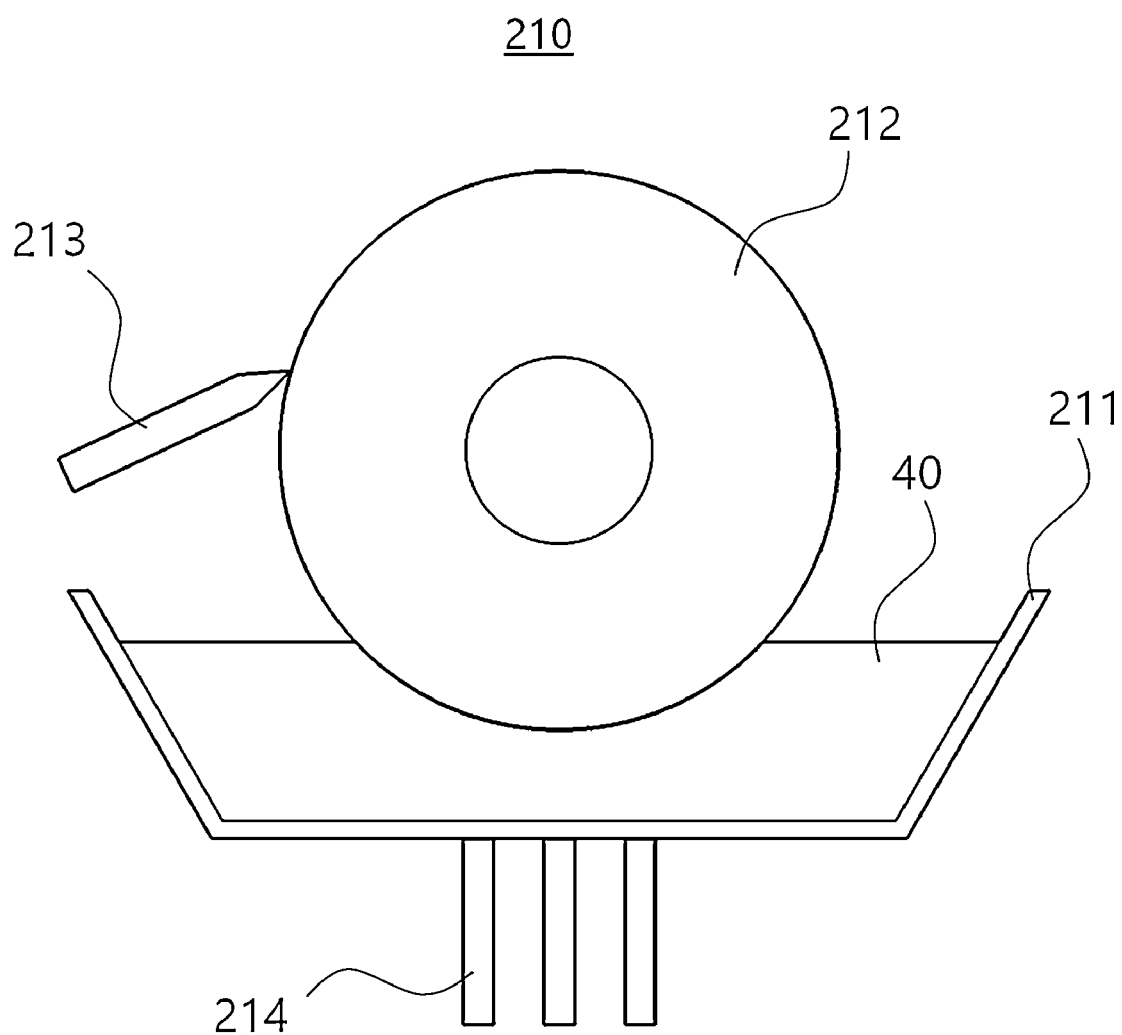

【FIG. 4】
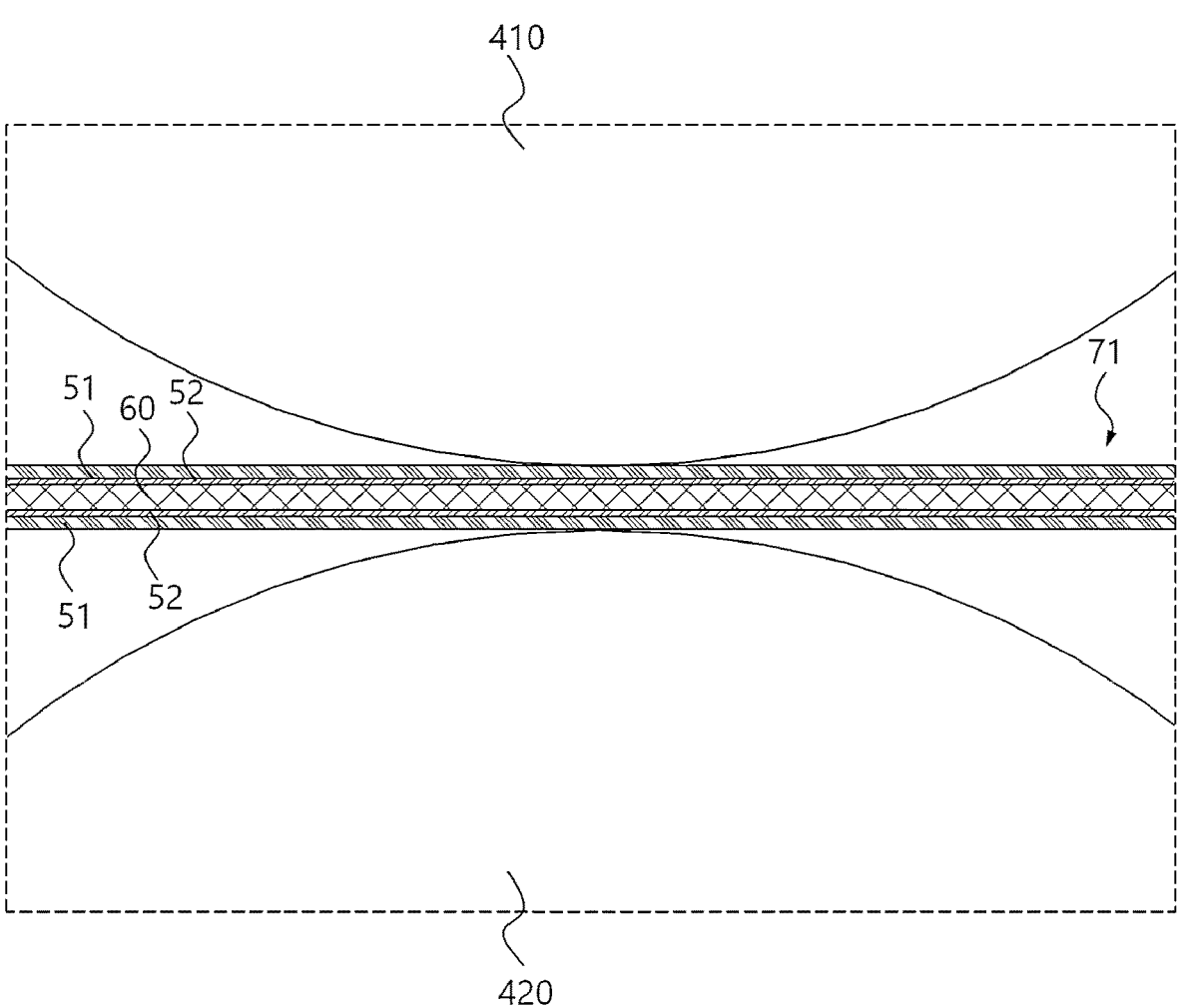

APPARATUS FOR MANUFACTURING A COMPOSITE DEIONIZATION ELECTRODE

CROSS-REFERENCE TO RELATED APPLICATION

This application is the US National Stage of International Patent Cooperation Treaty (PCT) number PCT/KR2020/017930, filed 9 Dec. 2020, which in turn, claims priority benefit of Korean application number 10-2019-0167559, filed 16 Dec. 2019, the entire contents of each of which are herein incorporated by reference in their entireties.

TECHNICAL FIELD

The present invention relates to an apparatus and a method for manufacturing a composite deionization electrode

BACKGROUND ART

A capacitive deionization (CDI) electrode having an ion exchange layer has been extensively studied by the present inventors. For example, in patents such as Korean Patent No. 10-1410642 (published on Jun. 17, 2014), a technology of forming an ion exchange layer by coating a slurry containing ion exchange resin powders or the like on a carbon electrode layer (active layer) has been known. However, in the related art described above, only a conceptual process of simply forming a deionization electrode is simply described, and a specific mass production process of the deionization electrode is not described. In addition, even though the ion exchange layer is coated on an upper portion of a specific film in order to manufacture the deionization electrode as described above, the ion exchange layer may be non-uniformly formed, and the coating is performed in a state in which tension of the film itself in a width direction may not be sufficiently secured, such that the deionization electrode having a relatively low coating quality is formed.

Disclosure

Technical Problem

An object of the present invention is to provide an apparatus and a method for manufacturing a composite deionization electrode capable of mass-producing a high-quality composite deionization electrode by coating an ion exchange layer having a uniform thickness in a state in which tension of a sheet on which the ion exchange layer is formed is sufficiently secured, in a process of manufacturing the composite deionization electrode. In addition, a capacitive deionization (CDI) technology of removing dissolved ions in water shows excellent deionization performance as a content of ion exchange functional groups increases, but a moisture content of a membrane also increases, such that mechanical strength decreases, and thus, there is a limitation in introducing many ion exchange functional groups. The present invention may provide a CDI electrode having excellent mechanical strength and ion exchange performance by utilizing a hydrophobic porous polymer sheet as a support.

Technical Solution

In one general aspect, an apparatus for manufacturing a composite deionization electrode includes: a polymer sheet supply part supplying a polymer sheet; a polymer sheet impregnation part impregnating the polymer sheet supplied from the polymer sheet supply part with an ion exchange solution; an electrode sheet supply part supplying a carbon electrode sheet; an undercoating part manufacturing a first composite by laminating the polymer sheet impregnated in the polymer sheet impregnation part on each of both surfaces of the carbon electrode sheet supplied from the electrode sheet supply part; a top coating part manufacturing a second composite by coating both surfaces of the first composite with an ion exchange solution; and a drying part drying the second composite.

In another general aspect, an apparatus for manufacturing a composite deionization electrode includes: a polymer sheet supply part supplying a polymer sheet of which one surface or both surfaces are coated with an ion exchange layer; an electrode sheet supply part supplying a carbon electrode sheet; and an undercoating part laminating the polymer sheet supplied from the polymer sheet supply part on each of both surfaces of the carbon electrode sheet.

The apparatus for manufacturing a composite deionization electrode may further include a surface treatment part surface-treating the polymer sheet supplied from the polymer sheet supply part using corona discharge or plasma.

The polymer sheet may be a porous polymer sheet.

The apparatus for manufacturing a composite deionization electrode may further include an expanding roll disposed between the polymer sheet supply part and the undercoating part and expanding the polymer sheet in a width direction.

The polymer sheet impregnation part may include: an ion exchange solution accommodating part in which the ion exchange solution is accommodated; a coating roller disposed above the ion exchange solution accommodating part, having a surface partially immersed in the ion exchange solution, having an upper surface in contact with the polymer sheet to adjust a moving direction of the polymer sheet, and having a plurality of grooves formed in the surface to impregnate one surface of the polymer sheet; and a blade having a plate shape and formed on a side to which the polymer sheet is supplied, such that a tip thereof is in contact with the surface of the coating roller to make the surface of the coating roller to which the ion exchange solution is adhered uniform, when the coating roller is divided in half based on an upper end and a lower end.

The ion exchange solution accommodating part may be configured to be movable upward or downward.

The groove formed in the surface of the coating roller may have a depth of 0.01 to 1 mm.

The groove formed in the surface of the coating roller may have a size of 500 mesh or less.

The number of polymer sheet supply parts may be two, the undercoating part may include a first laminating roller and a second laminating roller that are sequentially disposed in a vertical direction, and two polymer sheets supplied from the two polymer sheet supply parts and the carbon electrode sheets supplied to a space between the two polymer sheets may pass and be laminated through the first laminating roller and the second laminating roller.

At least one of the first laminating roller and the second laminating roller may be movable to the other of the first laminating roller and the second laminating roller.

The top coating part may include a first coating part; a second coating part; and a direction changing roller, each of the first coating part and the second coating part may include: an ion exchange solution accommodating part in which an ion exchange aqueous solution is accommodated;

a coating roller disposed above the ion exchange solution accommodating part, having a surface partially immersed in the ion exchange solution, having an upper surface in contact with one surface of the first composite to adjust a moving direction of the first composite, and having a plurality of grooves formed in the surface to coat one surface of the first composite; and a blade having a plate shape and formed on a side to which the first composite is supplied, such that a tip thereof is in contact with the surface of the coating roller to make the surface of the coating roller to which the ion exchange solution is adhered uniform, when the coating roller is divided in half based on an upper end and a lower end, and a supply direction of the first composite of which one surface is coated with the ion exchange solution through the first coating part may be changed through the direction changing roller, such that an upper surface of the coating roller included in the second coating part is in contact with one of both surfaces of the first composite that is not coated with the ion exchange solution.

In one general aspect, a method for manufacturing a composite deionization electrode includes: a) impregnating a porous polymer sheet with an ion exchange solution; b) manufacturing a first composite by laminating the porous polymer sheet impregnated with the ion exchange solution in step a) on each of both surfaces of a carbon electrode sheet; c) manufacturing a second composite by coating both surfaces of the first composite with an ion exchange solution; and d) drying the second composite manufactured in step c).

In another general aspect, a method for manufacturing a composite deionization electrode includes: a) supplying a polymer sheet of which one surface or both surfaces are coated with an ion exchange layer; and b) laminating the polymer sheet of which one surface or both surfaces are coated with the ion exchange layer in step a) on each of both surfaces of a carbon electrode sheet.

In step a), the porous polymer sheet may be surface-treated using corona discharge or plasma, and then impregnated with the ion exchange solution.

In step a), the porous polymer sheet before or after being impregnated with the ion exchange solution may be supplied to a next step while being expanded in a width direction.

In step a), a coating roller may rotate in a state in which a portion of a surface thereof is immersed in an ion exchange solution accommodating part in which the ion exchange solution is accommodated, the porous polymer sheet may be in contact with an upper surface of the coating roller, such that one surface of the porous polymer sheet is coated, and at the same time, a moving direction of the porous polymer sheet is adjusted, and a tip of the blade disposed on a side to which the porous polymer sheet is supplied may be in contact with the surface of the coating roller to make the surface of the coating roller to which the ion exchange solution is adhered uniform, when the coating roller is divided in half based on an upper end and a lower end.

In step a), two porous polymer sheets may be individually impregnated with the ion exchange solution, and in step b), the first composite may be manufactured by laminating the two porous polymer sheets impregnated with the ion exchange solution in step a) on both surfaces of a carbon electrode sheet, respectively.

Step c) may include: c-1) rotating a coating roller in a state in which a portion of a surface of the coating roller is immersed in an ion exchange solution accommodating part in which the ion exchange solution is accommodated, bringing the first composite into contact with an upper surface of the coating roller to coat one surface of the first composite, and at the same time, adjust a moving direction of the porous polymer sheet, and bringing a tip of the blade disposed on a side to which the porous polymer sheet is supplied into contact with the surface of the coating roller to make the surface of the coating roller to which the ion exchange solution is adhered uniform, when the coating roller is divided in half based on an upper end and a lower end; c-2) changing a supply direction of the first composite of which one surface is coated with the ion exchange solution in step c-1) using a direction changing roller; and c-3) rotating a coating roller in a state in which a portion of a surface of the coating roller is immersed in an ion exchange solution accommodating part in which the ion exchange solution is accommodated, bringing one of both surfaces of the first composite that is not coated with the ion exchange solution into contact with the upper surface of the coating roller to coat one surface of the first composite, and at the same time, adjust a moving direction of the porous polymer sheet, and bringing the tip of the blade disposed on the side to which the porous polymer sheet is supplied into contact with the surface of the coating roller to make the surface of the coating roller to which the ion exchange solution is adhered uniform, when the coating roller is divided in half based on the upper end and the lower end.

In step a), the polymer sheet may be supplied to a next step while being expanded in a width direction.

Advantageous Effects

With the apparatus and method for manufacturing a composite deionization electrode according to the present invention as described above, the porous polymer sheet on which the ion exchange layer is formed is expanded in the width direction using the expanding roll before or after the ion exchange layer is formed, and thus, a quality of the finally manufactured composite deionization electrode is improved.

In addition, according to the present invention, before the ion exchange layer is coated on the porous polymer sheet, hydrophilicity is imparted to the surface of the porous polymer sheet using corona discharge or plasma treatment, and thus, an ion-selective polymer is more easily filled in pores.

Further, according to the present invention, in a process of coating the ion exchange layer on the porous polymer sheet, the blade scrapes the surface of the coating roller to make the ion exchange solution adhered to the surface of the coating roller uniform, such that a coating quality is improved.

DESCRIPTION OF DRAWINGS

FIG. 1 is a schematic view illustrating an apparatus for manufacturing a composite deionization electrode according to an embodiment of the present invention.

FIG. 2 is a schematic cross-sectional view illustrating an expanding roll of the apparatus for manufacturing a composite deionization electrode according to an embodiment of the present invention.

FIG. 3 is an enlarged view of a polymer sheet impregnation part of the apparatus for manufacturing a composite deionization electrode according to an embodiment of the present invention.

FIG. 4 is a partial enlarged view of the apparatus for manufacturing a composite deionization electrode according to an embodiment of the present invention.

BEST MODE

Hereinafter, a preferred embodiment of an apparatus and a method for manufacturing a composite deionization electrode according to the present invention will be described in detail with reference to the accompanying drawings.

FIG. 1 is a schematic view illustrating an apparatus for manufacturing a composite deionization electrode according to an embodiment of the present invention.

As illustrated in FIG. 1, the apparatus for manufacturing a composite deionization electrode according to an embodiment of the present invention may include a polymer sheet supply part, a surface treatment part, a polymer sheet impregnation part, an electrode sheet supply part 300, an undercoating part 400, and a top coating part, and a drying part 600.

The polymer sheet supply part is a device that supplies a porous polymer sheet. In the present embodiment, the number of polymer sheet supply parts may be two. Referring to FIG. 1, the two polymer sheet supply parts are referred to as a first polymer sheet supply part 111 and a second polymer sheet supply part 112, respectively.

The porous polymer sheets supplied from the first polymer sheet supply part 111 and the second polymer sheet supply part 112 are thin films in which pores are formed, and ion exchange resin layers are formed on both sides of the porous polymer sheet through another configuration according to the present embodiment to be described later, such that mechanical properties and chemical resistance such as warpage strength, distortion resistance, impact resistance, and elasticity of the composite deionization electrode manufactured through the present embodiment may be improved. The porous polymer sheet may be a polymer film typified by a polyolefin-based film. In detail, the porous polymer sheet may be a porous polymer sheet including two or more selected from the group consisting of high-density polyethylene, linear low-density polyethylene, low-density polyethylene, ultra-high molecular weight polyethylene or polypropylene, or derivatives thereof. However, the present invention does not limit a material of the porous polymer sheet as those described above, and a cellulose-based material may be used as the material of the porous polymer sheet or an organic-inorganic hybrid-based material in which an inorganic raw material is mixed with a polymer may be used as the material of the porous polymer sheet for the purpose of reinforcing durability of the porous polymer sheet or for other purposes.

Thicknesses of the first polymer sheet supply part 111 and the second polymer sheet supply part 112 may be 1 to 500 μm, and as a preferred example, a thickness of the porous polymer sheet may be 5 to 30 μm in order to sufficiently have mechanical properties such as warpage characteristics and impact strength.

As illustrated in FIG. 1, the porous polymer sheet supplied from the first polymer sheet supply part 111 is rolled around a roller included in the first polymer sheet supply part 111, and may thus be in a state in which it is not reliably expanded in a width direction. In this case, a quality of the finally produced composite deionization electrode may be affected. In order to prevent such a situation, in the present embodiment, the porous polymer sheet supplied from the first polymer sheet supply part 111 is expanded in the width direction using an expanding roll. In the present invention, a plurality of expanding rolls may be used. Referring to FIG. 1, in the present embodiment, a first expanding roll 131, a second expanding roll 132, a third expanding roll 133, and a fourth expanding roll 134 may be used.

FIG. 2 is a schematic cross-sectional view illustrating a single expanding roll.

As illustrated in FIG. 2, the single expanding roll may include a shaft 10, a first body part 21, a second body part 22, a fixed rotating member 31, and an expanding rotating member 32. The shaft 10 is a portion that is coupled to the first body part 21 and the second body part 22 to rotate, and the first body part 21 and the second body part 22 are portions that rotate less than the shaft 10 or are fixed. The fixed rotating member 31 and the expanding rotating member 32 are coupled to outer sides of the first body part 21 and the second body part 22, respectively, and rotate together with the shaft 10. A structure of a cam 23 is formed in an outer peripheral surface of the second body part 22. The cam 23 has a shape of a groove formed in an oblique line in the outer peripheral surface of the second body part 22, and a 180° section in the groove formed in the oblique line is a section facing outward in FIG. 2, and the remaining 180° section in the groove formed in the oblique line is a section facing inward in FIG. 2. An extension member extending toward the shaft 10 may be formed inside the expanding rotating member 32, a bearing 33 may be formed at a tip of the extension member and be inserted into the cam 23 formed in the outer peripheral surface of the second body part 22, and the bearing 33 is inserted into the cam 23. The shaft 10 is physically connected to the bearing 33, and when the shaft 10 rotates, the expanding rotating member 32 moves inward or outward. In FIG. 2, the cam 23 is formed to face inward at an upper end thereof and is formed to face outward from a lower end thereof, and thus, the expanding rotating member 32 moves inward when it is positioned at a portion corresponding to the upper end of the cam 23 and moves outward when it is positioned at a portion corresponding to the lower end of the cam 23. Accordingly, in the present embodiment, a portion where the expanding rotating member 32 moves outward the most may be in contact with the porous polymer sheet, an upper end of the first expanding roll 131 illustrated in FIG. 1 may be a lower end of the first expanding roll 131 illustrated in FIG. 2, and a direction of the first expanding roll 131 may be changed depending on a direction in which the porous polymer sheet is supplied. In FIG. 2, the fixed rotating member 31 rotates at the same place based on the width direction of the shaft 10 without moving inward or outward even when the shaft 10 rotates.

As illustrated in FIG. 1, the porous polymer sheet supplied from the first polymer sheet supply part 111 is expanded in the width direction through the first expanding roll 131, and then passes through a first surface treatment part 121. The first surface treatment part 121 performs a process of imparting hydrophilicity by treating a surface of the porous polymer sheet, and may use corona discharge or use a plasma treatment method. In the present embodiment, the porous polymer sheet supplied through the first polymer sheet supply part 111 is expanded through the first expanding roll 131 and then surface-treated by the first surface treatment part 121, while the porous polymer sheet supplied from the second polymer sheet supply part 112 is surface-treated through a second surface treatment part 122, and then expanded through the third expanding roll 133. That is, in the present embodiment, the order of operations before the porous polymer sheets are supplied to the polymer sheet impregnation part is different, and may be changed depending on a situation. Each of the second expanding roll 132, the third expanding roll 133, and the fourth expanding roll 134 described above may have the same configuration as the first expanding roll 131, and a position of each expanding roll may be determined so that a portion of each expanding roll in contact with the porous polymer sheet supplied to each expanding roll comes into contact with a portion where the expanding rotating member is expanded as much as possible.

The porous polymer sheet to which the hydrophilicity is imparted by the first surface treatment part 121 may be impregnated with an ion exchange solution in a first polymer sheet impregnation part 210. More specifically, the first polymer sheet impregnation part 210 according to the present embodiment may coat only one surface of the porous polymer sheet with the ion exchange solution.

FIG. 3 is an enlarged view of only the first polymer sheet impregnation part 310.

As illustrated in FIG. 3, in the present embodiment, the first polymer sheet impregnation part 210 may include an ion exchange solution accommodating part 211, a coating roller 212, and a blade 213.

As illustrated in FIG. 3, the ion exchange solution accommodating part 211 is a type of water tank in which an ion exchange solution 40 is accommodated, and may be installed to be movable upward or downward through sliding structures 214. The ion exchange solution 40 is for coating an ion exchange layer on a lower surface of the porous polymer sheet. The reason that the ion exchange solution accommodating part 211 is configured to be movable upward or downward through the sliding structures 214 is to make it easier to fill the ion exchange solution, when the ion exchange solution 40 needs to be filled, a user may move the ion exchange solution accommodating part 211 downward to allow the coating roller 212 not to be immersed in the ion exchange solution 40, and after the filling of the ion exchange solution 40 is completed, the user may move the ion exchange solution accommodating part 211 upward to allow a portion of the coating roller 212 to be immersed in the ion exchange solution 40.

When the coating roller 212 coats the lower surface of the porous polymer sheet, a lower end of the coating roller 212 is disposed to be immersed in the ion exchange solution 40, as illustrated in FIG. 3, and an upper end of the coating roller 212 is disposed to be in contact with the lower surface of the porous polymer sheet, as illustrated in FIG. 2. Although not illustrated in the drawings, a plurality of grooves are formed in a surface of the coating roller 212, and the coating roller 212 rotates clockwise in FIG. 3 to coat the lower surface of the porous polymer sheet. More specifically, when the coating roller 212 rotates clockwise, the ion exchange solution 40 is adhered to the plurality of grooves formed in the surface of the coating roller 212, and the ion exchange solution 40 adhered to the surface of the coating roller 212 forms a coating layer while being in contact with the lower surface of the porous polymer sheet. A size of the groove formed in the surface of the coating roller 212 may be 500 mesh or less, and a depth of the groove may be 0.01 to 1 mm.

The ion exchange solution may be adhered to the surface of the coating roller 212 at an irregular level, which may have a great influence on a coating quality of the porous polymer sheet. The blade 213 is a device added in order to solve this, and when the coating roller 212 is divided into a left side and a right side based on an upper end (portion in contact with the porous polymer sheet) and a lower end (portion immersed in the ion exchange solution), the blade 213 is positioned in a direction in which the porous polymer sheet is supplied, such that a tip thereof is in contact with the surface of the coating roller 212. The tip of the blade 213 may serve to scrape the ion exchange solution irregularly adhered to the surface of the coating roller 212 to make the ion exchange solution uniform, thereby improving the coating quality of the porous polymer sheet.

As illustrated in FIG. 1, the porous polymer sheet supplied from the second polymer sheet supply part 112 is impregnated with an ion exchange solution in a second polymer sheet impregnation part 220. Since a supply direction of the porous polymer sheet supplied from the second polymer sheet supply part 112 is changed using the third expanding roll 133 and a general roll, a direction of a blade may also be different from that in the first polymer sheet impregnation part 210, and a direction of the porous polymer sheet of which a lower surface is coated with the ion exchange solution in the second polymer sheet impregnation part 220 is changed through the roll, and the porous polymer sheet is supplied in a state in which the coated one surface faces upward.

The porous polymer sheets of which one surfaces are coated in each of the first polymer sheet impregnation part 210 and the second polymer sheet impregnation part 220 may be supplied to the undercoating part 400 while being expanded in the width direction through the second expanding roll 132 and the fourth expanding roll 134. Not only the two porous polymer sheets, but also a carbon electrode sheet supplied from the electrode sheet supply part 300 may be supplied to the undercoating part 400.

The carbon electrode sheet supplied from the electrode sheet supply part 300 is for improving adsorption/desorption efficiency of ions, and may be formed of any material as long as it is a carbon-based electrode. The carbon electrode sheet may be configured to include any one or two or more carbon-based materials selected from the group consisting of activated carbon particles, carbon fibers, carbon nanotubes, graphite particles, and the like. In addition, the carbon electrode sheet is a carbon electrode, and may further include a durability/weather resistance improving material, which is a material capable of improving deionization efficiency. As a specific example, the carbon electrode sheet may be manufactured by coating a slurry including a carbon-based material, a binder, and an organic solvent in the form of a film and drying the slurry. In addition, in some cases, an electrode active material or the like may be further added to the slurry in order to increase a specific surface area and a capacitance. However, this is only described as a specific example, and various other materials may be further added.

FIG. 4 an enlarged view of the respective sheets supplied to the undercoating part 400.

As illustrated in FIG. 4, the undercoating part 400 may include a first laminating roller 410 and a second laminating roller 420 that are sequentially disposed in a vertical direction. At least one of the first laminating roller 410 and the second laminating roller 420 may be configured to be movable upward or downward to adjust a pressure of sheets of laminated (laminated) as one sheet through the undercoating part 400. Ion exchange layers 52 are formed between the two porous polymer sheets 51 and the carbon electrode sheet 60 supplied to a space between the first laminating roller 410 and the second laminating roller 420, and the two porous polymer sheets 51 and the carbon electrode sheet 60 pass through the first laminating roller 410 and the second laminating roller 420 to manufacture a first composite 71.

An ion exchange layer is in a state in which it is not coated on a surface of the first composite 71 manufactured through the undercoating part 400, the surface of the first composite 71 is coated with an ion exchange solution through the top coating part, and as illustrated in FIG. 1, the top coating part may include a first coating part 510, a second coating part 520, and a direction changing roller 530 in order to perform the operation as described above.

Each of the first coating part 510 and the second coating part 520 has the same configuration as the first polymer sheet impregnation part, and coats a lower surface of the first composite with an ion exchange solution in the same manner as the first polymer sheet impregnation part. However, since only each of the first coating part 510 and the second coating part 520 may coat only the lower surface of the first composite with the ion exchange solution, the direction changing roller 530 is disposed between the first coating part 510 and the second coating part 520 and changes a supply direction of the first composite of which the lower surface is coated in the first coating part 510 to allow one surface that is not coated with the ion exchange solution to be positioned on a lower side. Thereafter, both surfaces of the first composite are coated with the ion exchange solution using the second coating part 520 to manufacture the first composite 71 as a second composite 72.

The second composite 72 is supplied into the drying part 600 through a plurality of rollers, and the drying part 600 dries the second composite 72 using infrared rays and hot air. The second composite 72 dried through the drying part 600 may be re-wound or cut.

A process of forming the ion exchange layers on one surfaces of the porous polymer sheets on which the ion exchange layers are not formed and then laminating the porous polymer sheets 51 on both surfaces of the carbon electrode sheet 60 has been described. The present invention is not limited thereto, and the polymer sheets having the ion exchange layers formed on one surface or both surfaces thereof may be laminated on both surfaces of the carbon electrode sheet 60, respectively. To this end, the polymer sheets having ion exchange layers are wound around the first polymer sheet supply part 111 and the second polymer sheet supply part 112, and are supplied from the first polymer sheet supply part 111 and the second polymer sheet supply part 112 to the undercoating part 400, such that the polymer sheets having the ion exchange layers may be laminated on both surfaces of the carbon electrode sheet 60. In this case, the ion exchange layers may be formed on both surfaces of the polymer sheet, or the ion exchange layer may be formed on one of both surfaces of the polymer sheet facing the carbon electrode sheet 60. The reason that the ion exchange layer is formed on one of both surfaces of the polymer sheet facing the carbon electrode sheet 60 is to enable the ion exchange layer to be formed on one of both surfaces of the polymer sheet on which the ion exchange layer is not formed in the top coating part.

The polymer sheet wound around and supplied from the first polymer sheet supply part 111 and the second polymer sheet supply part 112 of the apparatus for manufacturing a composite deionization electrode according to another embodiment of the present invention described above may not be a porous polymer sheet.

Hereinafter, a preferred embodiment of a method for manufacturing a composite deionization electrode according to the present invention will be described in detail with reference to the accompanying drawings.

The method for manufacturing a composite deionization electrode according to the present invention may be performed using the apparatus for manufacturing a composite deionization electrode according to the present invention illustrated in FIGS. 1 to 4, and may include step a) step b), step c), and step d) that are sequentially performed.

In step a), the porous polymer sheet supplied from one side is impregnated with the ion exchange solution. In step a) of the present invention, the porous polymer sheet may be impregnated with the ion exchange solution using various methods, but in step a) of the present embodiment, the porous polymer sheet supplied from the polymer sheet supply part may be impregnated with the ion exchange solution in the polymer sheet impregnation part. There may be two entities supplying the porous polymer sheets in step a), these two entities may be the first polymer sheet supply part 111 and the second polymer sheet supply part 112 illustrated in FIG. 1, and the porous polymer sheets supplied from the respective polymer sheet supply parts may be impregnated with the ion exchange solutions in the first polymer sheet impregnation part 210 and the second polymer sheet impregnation part 220, respectively.

In step a), hydrophilicity of the porous polymer sheet may be increased using surface treatment before the porous polymer sheet is impregnated with the ion exchange solution, and corona discharge or a plasma treatment method may be used as this method. In step a), the surface treatment of the porous polymer sheet may be performed by the first surface treatment part 121 or the second surface treatment part 122.

In addition, in step a), the porous polymer sheet before or after being impregnated with the ion exchange solution may be supplied to the next step while being expanded in the width direction, which may be performed through the first to fourth expanding rolls illustrated in FIG. 1.

In step b), the first composite is manufactured by laminating the porous polymer sheets impregnated with the ion exchange solutions in step a) on both surfaces of the carbon electrode sheet, respectively. The carbon electrode sheet may be supplied from the electrode sheet supply part 300, and may be supplied as a component supported and laminated through a plurality of rollers. In step b), the first composite is manufactured by the undercoating part 400.

Step c) is a step of manufacturing the second composite by coating both surfaces of the first composite with the ion exchange solutions and may be sequentially performed in the first coating part 510 and the second coating part 520, and the first coating part 510 and the second coating part 520 manufacture the second composite by coating both surfaces of the first composite with the ion exchange solutions through the same method as the first polymer sheet impregnation part 210 described above. Upper and lower surfaces of the first composite of which one surface is coated through the first coating part 510 may be changed through the direction changing roller 530, and the first composite may be supplied so that the lower surface may be coated in the second coating part 520.

In step d), the second composite manufactured in step c) is dried, which may be performed by the drying part 600. The drying part 600 dries the second composite supplied into the drying part 600 by using an infrared lamp or hot air.

In the method for manufacturing a composite deionization electrode according to the present invention, a process of forming the ion exchange layers on one surfaces of the porous polymer sheets on which the ion exchange layers are not formed and then laminating the porous polymer sheets 51 on both surfaces of the carbon electrode sheet 60 has been described. The method for manufacturing a composite deionization electrode according to the present invention is not limited thereto, and the porous polymer sheets 51 having the ion exchange layers formed on one surface or both surfaces thereof may be laminated on both surfaces of the carbon electrode sheet 60, respectively. To this end, the method for manufacturing a composite deionization electrode may include step a) of supplying the polymer sheets of which one surfaces or both surfaces are coated with the ion exchange layers and step b) of laminating the polymer sheets of which one surfaces or both surfaces are coated with the ion exchange layers in step a) on both surfaces of the carbon electrode sheet, respectively.

The present invention is not limited to the above-described embodiments, but may be variously applied, and may be variously modified without departing from the gist of the present invention claimed in the claims.

| [Detailed Description of Main Elements] | |
|---|---|
| 10: | shaft |
| 21: | first body part |
| 22: | second body part |
| 23: | cam |
| 31: | fixed rotating member |
| 32: | expanding rotating member |
| 33: | bearing |
| 40: | ion exchange solution |
| 51: | porous polymer sheet |
| 52: | ion exchange layer |
| 60: | carbon electrode sheet |
| 71: | first composite |
| 72: | second composite |
| 111: | first polymer sheet supply part |
| 112: | second polymer sheet supply part |
| 121: | first surface treatment part |
| 122: | second surface treatment part |
| 131: | first expanding roll |
| 132: | second expanding roll |
| 133: | third expanding roll |
| 134: | fourth expanding roll |
| 210: | first polymer sheet impregnation part |
| 211: | ion exchange solution accommodating part |
| 212: | coating roller |
| 213: | blade |
| 214: | sliding structure |
| 220: | second polymer sheet impregnation part |
| 300: | electrode sheet supply part |
| 400: | undercoating part |
| 410: | first laminating roller |
| 420: | second laminating roller |
| 510: | first coating part |
| 520: | second coating part |
| 530: | direction changing roller |
| 600: | drying part |

The invention claimed is:

1. An apparatus for manufacturing a composite deionization electrode, comprising:

two polymer sheet supply units, each configured to supply a respective polymer sheet;

two polymer sheet impregnation units, each comprising a tank containing an ion exchange solution and configured to impregnate the polymer sheet supplied from a corresponding polymer sheet supply unit with the ion exchange solution;

an electrode sheet supply unit configured to supply a carbon electrode sheet;

an undercoating unit comprising a first laminating roller and a second laminating roller that are sequentially disposed in a vertical direction, the undercoating unit being arranged to laminate each of the two polymer sheets on a respective one of the opposite surfaces of the carbon electrode sheet supplied from the electrode sheet supply unit to form a first composite;

a top coating unit comprising a tank containing an ion exchange solution configured to coat both surfaces of the first composite with the ion exchange solution from the tank of the top coating unit to produce a second composite; and a drying unit configured to dry the second composite;

wherein the carbon electrode sheet is supplied between the two polymer sheets through the undercoating unit, and the two polymer sheets and the carbon electrode sheet pass and are laminated through the first laminating roller and the second laminating roller.

2. The apparatus for manufacturing the composite deionization electrode of claim 1, further comprising a surface treatment unit configured to surface treat the polymer sheet supplied from the polymer sheet supply unit using corona discharge or plasma.

3. The apparatus for manufacturing the composite deionization electrode of claim 1, wherein the polymer sheet is a porous polymer sheet.

4. The apparatus for manufacturing the composite deionization electrode of claim 1, further comprising an expanding roll disposed between the polymer sheet supply unit and the undercoating unit to expand the polymer sheet in a width direction.

5. An apparatus for manufacturing a composite deionization electrode, comprising:

a polymer sheet supply unit supplying a polymer sheet;

a polymer sheet impregnation unit impregnating the polymer sheet supplied from the polymer sheet supply unit with an ion exchange solution;

an electrode sheet supply unit supplying a carbon electrode sheet;

after the polymer sheet leaves the polymer sheet impregnation unit impregnated, an undercoating unit receives the carbon electrode sheet and the polymer sheet which has been impregnated with the ion exchange solution, and the undercoating unit laminates the polymer sheet onto each of both surfaces of the carbon electrode sheet to form a first composite, wherein said carbon electrode sheet is supplied to the undercoating unit from the electrode sheet supply unit;

a top coating unit manufacturing a second composite by coating both surfaces of the first composite with an ion exchange solution from an ion exchange solution accommodating part of the top coating coating unit; and a drying unit drying the second composite, wherein the polymer sheet impregnation unit includes:

an ion exchange solution accommodating unit in which the ion exchange solution of the polymer sheet impregnation unit is accommodated;

a coating roller disposed above the ion exchange solution accommodating unit of the polymer sheet impregnation unit, having a surface partially immersed in the ion exchange solution, having an upper surface in contact with the polymer sheet to adjust a moving direction of the polymer sheet, and having a plurality of grooves formed in the surface to impregnate one surface of the polymer sheet; and a blade having a plate shape and formed on a side to which the polymer sheet is supplied, such that a tip thereof is in contact with the surface of the coating roller to make the surface of the coating roller to which the ion exchange solution is adhered uniform, when the coating roller is divided in half based on an upper end and a lower end.

6. The apparatus for manufacturing the composite deionization electrode of claim 5, wherein the ion exchange solution accommodating unit of the polymer sheet impregnation unit includes sliding structures and the ion exchange solution accommodating unit is configured to be movable upward or downward through the sliding structures.

7. The apparatus for manufacturing the composite deionization electrode of claim 5, wherein the groove formed in the surface of the coating roller has a depth of 0.01 mm to 1 mm.

8. The apparatus for manufacturing the composite deionization electrode of claim 5, wherein the groove formed in the surface of the coating roller has a size of 500 mesh or less.

9. The apparatus for manufacturing the composite deionization electrode of claim 1, wherein at least one of the first laminating roller and the second laminating roller is relatively movable to the other of the first laminating roller and the second laminating roller.

10. An apparatus for manufacturing a composite deionization electrode, comprising:

a polymer sheet supply unit supplying a polymer sheet;

a polymer sheet impregnation unit impregnating the polymer sheet supplied from the polymer sheet supply unit with an ion exchange solution to form an impregnated polymer sheet;

an electrode sheet supply unit supplying a carbon electrode sheet;

the polymer sheet impregnation unit is configured to supply at least two impregnated polymer sheets to the undercoating unit;

after the at least two impregnated polymer sheets leave the polymer sheet impregnation unit impregnated with the ion exchange solution, the undercoating unit receives the carbon electrode sheet and the impregnated polymer sheets, and the undercoating unit laminates each of both surfaces of the carbon electrode sheet with one impregnated polymer sheet to form a first composite, wherein said carbon electrode sheet is supplied to the undercoating unit from the electrode sheet supply unit;

a top coating unit manufacturing a second composite by coating both surfaces of the first composite with an ion exchange solution from an ion exchange solution accommodating unit of the top coating unit; and a drying unit drying the second composite, wherein the top coating unit includes a first coating unit; a second coating unit; and a direction changing roller, each of the first coating unit and the second coating unit includes:

the ion exchange solution accommodating unit in which the ion exchange solution of the top coating unit is accommodated;

a coating roller disposed above the ion exchange solution accommodating unit, having a surface partially immersed in the ion exchange solution, having an upper surface in contact with one surface of the first composite to adjust a moving direction of the first composite, and having a plurality of grooves formed in the surface to coat one surface of the first composite; and a blade having a plate shape and formed on a side to which the first composite is supplied, such that a tip thereof is in contact with the surface of the coating roller to make the surface of the coating roller to which the ion exchange solution is adhered uniform, when the coating roller is divided in half based on an upper end and a lower end, and a supply direction of the first composite of which one surface is coated with the ion exchange solution through the first coating unit is changed through the direction changing roller, such that an upper surface of the coating roller included in the second coating unit is in contact with one surface of the first composite that is not previously coated with the ion exchange solution.

* * * * *